United States Patent
Tokunaga

(10) Patent No.: US 12,344,041 B2
(45) Date of Patent: Jul. 1, 2025

(54) PNEUMATIC TIRE

(71) Applicant: The Yokohama Rubber Co., LTD., Tokyo (JP)

(72) Inventor: Reika Tokunaga, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 754 days.

(21) Appl. No.: 17/267,344

(22) PCT Filed: Aug. 9, 2019

(86) PCT No.: PCT/JP2019/031742
§ 371 (c)(1),
(2) Date: Feb. 9, 2021

(87) PCT Pub. No.: WO2020/032276
PCT Pub. Date: Feb. 13, 2020

(65) Prior Publication Data
US 2021/0260929 A1    Aug. 26, 2021

(30) Foreign Application Priority Data

Aug. 10, 2018  (JP) ................................. 2018-152119

(51) Int. Cl.
*B60C 11/03* (2006.01)
*B60C 11/12* (2006.01)

(52) U.S. Cl.
CPC ...... *B60C 11/0309* (2013.01); *B60C 11/1204* (2013.01); *B60C 11/1236* (2013.01);
(Continued)

(58) Field of Classification Search
CPC ............ B60C 11/1281; B60C 11/0306; B60C 11/0309; B60C 11/11; B60C 11/1204;
(Continued)

(56) References Cited

U.S. PATENT DOCUMENTS 5,211,781 A * 5/1993 Adam ................. B60C 11/0306
152/DIG. 3
5,388,625 A    2/1995 White
(Continued)

FOREIGN PATENT DOCUMENTS

CN    102076508 A    5/2011
CN    102529592 A    7/2012
(Continued)

*Primary Examiner* — Justin R Fischer
*Assistant Examiner* — Philip N Schwartz
(74) *Attorney, Agent, or Firm* — Thorpe North & Western

(57) ABSTRACT

In a pneumatic tire, a center land portion includes a plurality of center lug grooves and a plurality of center blocks. The plurality of center lug grooves penetrate the center land portion. The plurality of center blocks are defined by the plurality of center lug grooves. A middle land portion includes a plurality of middle lug grooves, a plurality of middle blocks, a notch portion, and a middle sipe. The plurality of middle lug grooves penetrate the middle land portion. The plurality of middle blocks are defined by the plurality of middle lug grooves. The notch portion is an edge portion on the center main groove side of each of the plurality of middle blocks and formed on an extension line of each of the plurality of center lug grooves. The middle sipe extends from the notch portion and opens to an edge portion on the shoulder main groove side.

20 Claims, 13 Drawing Sheets

(52) U.S. Cl.
CPC ...... B60C 11/1259 (2013.01); B60C 11/1281 (2013.01); *B60C 2011/0346* (2013.01); *B60C 2011/0348* (2013.01); *B60C 2011/0355* (2013.01); *B60C 2011/0372* (2013.01); *B60C 2011/0381* (2013.01)

(58) Field of Classification Search
CPC ............. B60C 11/1236; B60C 11/1259; B60C 2011/0346; B60C 2011/0355; B60C 2011/0372; B60C 2011/0381
See application file for complete search history.

(56) References Cited

U.S. PATENT DOCUMENTS

| | | | |
|---|---|---|---|
| 2006/0254684 A1* | 11/2006 | Tamura | B60C 11/13 152/209.22 |
| 2011/0146863 A1* | 6/2011 | Ochi | B60C 11/0304 152/209.18 |
| 2012/0118454 A1 | 5/2012 | Nagayasu et al. | |
| 2014/0345767 A1 | 11/2014 | Tanaka et al. | |
| 2017/0106701 A1 | 4/2017 | Ito | |
| 2021/0162815 A1* | 6/2021 | Gunji | B60C 11/0309 |

FOREIGN PATENT DOCUMENTS

| | | | | |
|---|---|---|---|---|
| CN | 104175811 A | | 12/2014 | |
| CN | 107053957 A | | 8/2017 | |
| DE | 102011082659 A1 | | 5/2012 | |
| EP | 2308695 A1 | | 4/2011 | |
| EP | 2808179 A1 | | 12/2014 | |
| EP | 3156261 A1 | | 4/2017 | |
| FI | 20116102 A | | 5/2012 | |
| JP | S61-102301 A | | 5/1986 | |
| JP | H10315707 A | * | 5/1997 | ............... B60C 3/04 |
| JP | 2000177327 A | * | 6/2000 | ............. B60C 11/01 |
| JP | 2002234312 A | * | 8/2002 | ............. B60C 11/04 |
| JP | 2010-12931 A | | 1/2010 | |
| JP | 2010168012 A | * | 8/2010 | ............. B60C 11/12 |
| JP | 2012-121542 A | | 6/2012 | |
| JP | 2014-181013 A | | 9/2014 | |
| JP | 2014-227157 A | | 12/2014 | |
| JP | 2017-74844 A | | 4/2017 | |
| JP | 2017-88021 A | | 5/2017 | |
| JP | 2017088021 A | * | 5/2017 | ............. B60C 11/13 |
| KR | 10-2011-0013538 A | | 2/2011 | |
| RU | 2011103726 A | | 8/2012 | |
| RU | 2011146125 A | | 5/2013 | |
| RU | 2014119838 A | | 11/2015 | |
| WO | 2010/001785 A1 | | 1/2010 | |

* cited by examiner

| | Conventional Example | Comparative Example | Example 1 | Example 2 | Example 3 | Example 4 | Example 5 |
|---|---|---|---|---|---|---|---|
| Number of main grooves | 4 | 4 | 4 | 4 | 4 | 4 | 4 |
| Middle lug groove | Yes | Yes | Yes | Yes | Yes | Yes | Yes |
| Center lug groove | None | Yes | Yes | Yes | Yes | Yes | Yes |
| Notch in middle block | None | Yes | Yes | Yes | Yes | Yes | Yes |
| Positional relationship between notch portion and center lug groove | - | Facing | Facing | Facing | Facing | Facing | Facing |
| Middle sipe | Yes (Through sipe) | None | Yes | Yes | Yes | Yes | Yes |
| L23/Wb2 | - | 0.25 | 0.10 | 0.50 | 0.90 | 0.50 | 0.50 |
| $\theta 31$ (deg) | - | - | 70 | 70 | 70 | 55 | 35 |
| $\theta 23$ (deg) | | 90 | 90 | 90 | 90 | 55 | 35 |
| $\theta 24$ (deg) | - | - | 90 | 90 | 90 | 55 | 35 |
| $\alpha$ (deg) | - | - | 180 | 180 | 180 | 180 | 180 |
| W21/W31 | - | 1.0 | 1.0 | 1.0 | 1.0 | 1.0 | 1.0 |
| Uneven wear resistance performance | 100 | 103 | 105 | 104 | 103 | 102 | 104 |
| Wet traction characteristics | 100 | 105 | 110 | 108 | 106 | 110 | 108 |

FIG. 12A

|  | Example 6 | Example 7 | Example 8 | Example 9 | Example 10 | Example 11 | Example 12 |
|---|---|---|---|---|---|---|---|
| Number of main grooves | 4 | 4 | 4 | 4 | 4 | 4 | 4 |
| Middle lug groove | Yes | Yes | Yes | Yes | Yes | Yes | Yes |
| Center lug groove | Yes | Yes | Yes | Yes | Yes | Yes | Yes |
| Notch in middle block | Yes | Yes | Yes | Yes | Yes | Yes | Yes |
| Positional relationship between notch portion and center lug groove | Facing | Facing | Facing | Facing | Facing | Facing | Facing |
| Middle sipe | Yes | Yes | Yes | Yes | Yes | Yes | Yes |
| L23/Wb2 | 0.50 | 0.50 | 0.50 | 0.50 | 0.50 | 0.50 | 0.50 |
| $\theta 31$ (deg) | 5 | 35 | 35 | 35 | 35 | 35 | 35 |
| $\theta 23$ (deg) | 5 | 35 | 35 | 35 | 35 | 35 | 35 |
| $\theta 24$ (deg) | 5 | 85 | 80 | 50 | 10 | 50 | 50 |
| $\alpha$ (deg) | 180 | 120 | 115 | 85 | 45 | 85 | 85 |
| W21/W31 | 1.0 | 1.0 | 1.0 | 1.0 | 1.0 | 1.5 | 2.0 |
| Uneven wear resistance performance | 106 | 106 | 108 | 106 | 104 | 104 | 104 |
| Wet traction characteristics | 106 | 112 | 110 | 112 | 114 | 116 | 118 |

FIG. 12B

PNEUMATIC TIRE

TECHNICAL FIELD

The present technology relates to a pneumatic tire and particularly relates to a pneumatic tire that can improve uneven wear resistance performance and wet traction performance of the tire.

BACKGROUND ART

In order to improve wet traction characteristics, a pneumatic tire for a pickup truck includes block rows defined by through lug grooves in a tread portion center region. However, block rigidity is low in such a configuration, and thus there is a problem that heel and toe wear is likely to occur. As a conventional pneumatic tire related to this problem, a technology described in Japan Unexamined Patent Publication No. 61-102301 has been known.

SUMMARY

The technology provides a pneumatic tire that can improve uneven wear resistance performance and wet traction performance of the tire.

A pneumatic tire according to an embodiment of the technology includes a shoulder main groove and a center main groove, a shoulder land portion, a middle land portion, and a center land portion. The shoulder main groove and the center main groove are disposed in one region demarcated by a tire equatorial plane. The shoulder land portion, the middle land portion and the center land portion are defined by the shoulder main groove and the center main groove. The center land portion includes a plurality of center lug grooves and a plurality of center blocks. The plurality of center lug grooves penetrate the center land portion. The plurality of center blocks are defined by the plurality of center lug grooves. The middle land portion includes a plurality of middle lug grooves, a plurality of middle blocks, a notch portion, and a middle sipe. The plurality of middle lug grooves penetrate the middle land portion. The plurality of middle blocks are defined by the plurality of middle lug grooves. The notch portion is an edge portion on the center main groove side of each of the plurality of middle blocks and formed on an extension line of each of the plurality of center lug grooves. The middle sipe extends from the notch portion and opens to an edge portion on the shoulder main groove side of each of the plurality of middle blocks.

In the pneumatic tire according to the embodiment of the technology, (1) the middle block is the edge portion on the center main groove side and provided with the notch portion on the extension line of the center lug groove, and this is advantageous in that drainage properties of a tread portion center region are improved and wet traction characteristics of the tire are improved. Additionally, (2) the middle block includes the middle sipe extending from the notch portion and opening to the edge portion of the shoulder main groove in the middle block, this is advantageous in that a difference in rigidity between a central portion of the middle block and a circumferential edge portion is alleviated and heel and toe wear of the tire is suppressed.

BRIEF DESCRIPTION OF DRAWINGS

FIGS. 12A-12B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
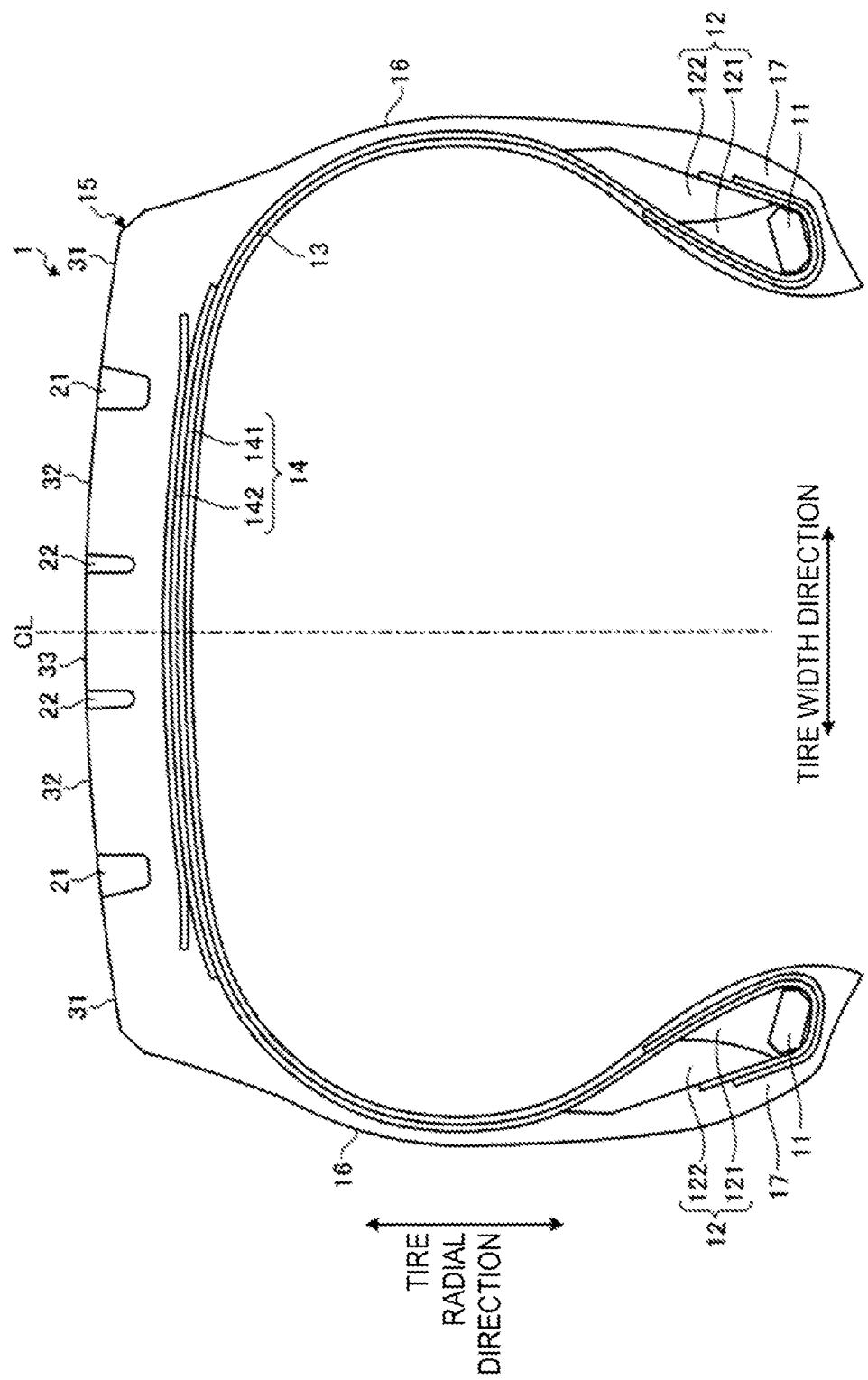
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The identical drawing illustrates a cross-sectional view of a half region in the tire radial direction. Also, the identical drawing illustrates an all-position tire for a pickup truck as an example of the pneumatic tire.

In reference to the same drawing, "cross section in a tire meridian direction" refers to a cross section of the tire taken along a plane that includes the tire rotation axis (not illustrated). Reference sign CL denotes a tire equatorial plane and refers to a plane normal to the tire rotation axis that passes through the center point of the tire in a tire rotation axis direction. "Tire width direction" refers to the direction parallel with the tire rotation axis. "Tire radial direction" refers to the direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 include one or a plurality of bead wires made of steel and wound annularly multiple times and are embedded in bead portions to configure cores of the left and right bead portions. The pair of bead fillers 12, 12 are disposed outward of the pair of bead cores 11, 11 in the tire radial direction and reinforce the bead portions.

The carcass layer 13 has a single layer structure made of one carcass ply or a multilayer structure made of a plurality of carcass plies being layered and extends between the left and right bead cores 11, 11 in a toroidal shape, forming the framework of the tire. Additionally, both end portions of the carcass layer 13 are turned back an outer side in the tire width direction so as to wrap around the bead cores 11 and the bead fillers 12 and fixed. Additionally, the carcass ply of the carcass layer 13 is made by performing rolling processing on a plurality of carcass cords made of steel or an organic fiber material (e.g. aramid, nylon, polyester, rayon, or the like) and covered with coating rubber. The carcass ply has a carcass angle (defined as the inclination angle of a longitudinal direction of the carcass cords with respect to a tire circumferential direction), as an absolute value of 80 degrees or greater and 90 degrees or smaller.

The belt layer 14 is formed by layering a pair of cross belts 141, 142 and disposed to be wound around the outer circumference of the carcass layer 13. The pair of cross belts 141, 142 are made by performing rolling processing on a plurality of on coating rubber-covered belt cords made of steel or an organic fiber material. The cross belts 141, 142 have a belt angle, as an absolute value, in a range not less than 15 degrees to not greater than 55 degrees. Additionally, the pair of cross belts 141, 142 have belt angles (defined as the inclination angles of the belt cords in the longitudinal direction with respect to the tire circumferential direction) of opposite signs, and the belts are layered with the belt cords intersecting each other (what is called a crossply structure) in the longitudinal direction.

The tread rubber 15 is disposed on the outer circumference in the tire radial direction of the carcass layer 13 and the belt layer 14 and constitutes a tread portion of a tire. The pair of sidewall rubbers 16, 16 are disposed on the outer side in the tire width direction of the carcass layer 13 and constitute left and right sidewall portions. The pair of rim cushion rubbers 17, 17 extend from an inner side in the tire radial direction of the left and right bead cores 11, 11 and turned back portions of the carcass layer 13 in an outer side in the tire width direction to constitute rim fitting surfaces of the bead portions.

Tread Pattern

Figure 2:
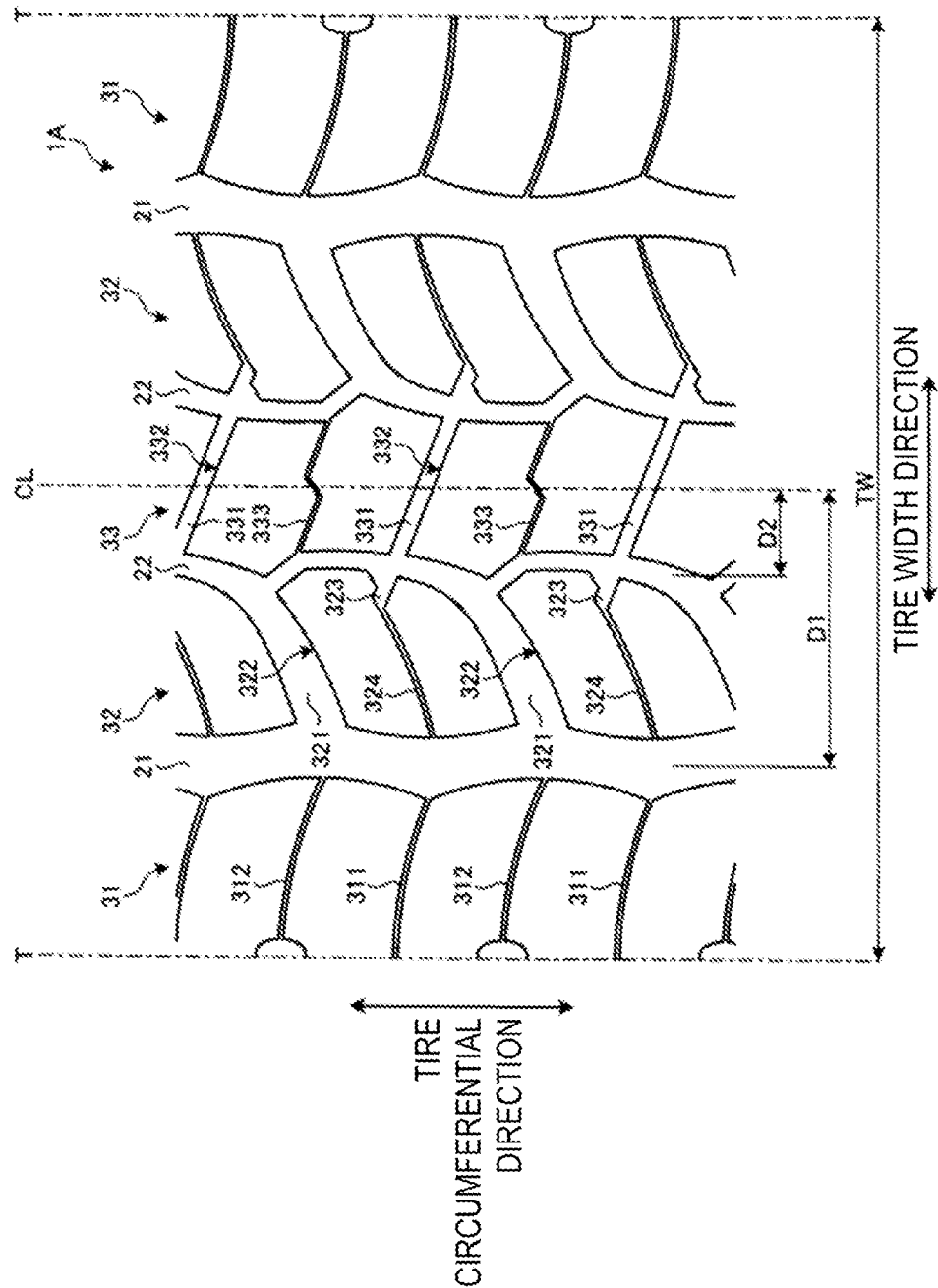
FIG. 2 is a plan view illustrating a tread surface of the pneumatic tire illustrated in FIG. 1.

FIG. 2 is a plan view illustrating a tread surface of the pneumatic tire 1 illustrated in FIG. 1. The identical drawing illustrates a tread surface of an all-position tire 1A for a pickup truck. In reference to the same drawing, "tire circumferential direction" refers to the direction revolving about the tire rotation axis. Reference sign T denotes a tire ground contact edge, and a dimension symbol W denotes a tire ground contact width.

As illustrated in FIG. 2, a pneumatic tire 1A is provided with, in the tread surface, a plurality of circumferential main grooves 21, 22 extending in the tire circumferential direction and a plurality of land portions 31 to 33 defined by the circumferential main grooves 21, 22.

"Main groove" refers to a groove on which a wear indicator must be provided as specified by JATMA (The Japan Automobile Tyre Manufacturers Association, Inc.) and has a groove width of 4.0 mm or greater and a groove depth of 6.5 mm or greater. In particular, in the tire for the pickup truck, the main groove has a groove depth of 10.0 mm or greater. Lug grooves described later are lateral grooves extending in the tire width direction and opening when the tire comes into contact with the ground to function as grooves. Additionally, sipes described later are notches formed in the tread contact surface and distinguished from the lug grooves in that the sipes close when the tire comes into contact with the ground.

The groove width is measured as a distance between left and right groove walls at a groove opening portion when the tire is mounted on a specified rim, inflated to a specified internal pressure, and in an unloaded state. In a configuration in which the land portion includes a notch portion or a chamfered portion on an edge portion thereof, the groove width is measured with intersection points between the tread contact surface and extension lines of the groove walls as measurement points, in a cross-sectional view with the groove length direction as a normal line direction.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by the JATMA, a "Design Rim" defined by the TRA (The Tire and Rim Association, Inc.), or a "Measuring Rim" defined by the ETRTO (The European Tyre and Rim Technical Organisation. Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in a case of a tire for a passenger vehicle, the specified internal pressure is an air pressure of 180 kPa, and the specified load is 88% of the maximum load capacity at the specified internal pressure.

For example, in the configuration of FIG. 2, the pneumatic tire 1 has a tread pattern substantially point symmetric with a center point on the tire equatorial plane CL. However, no such limitation is intended, and, for example, in the pneumatic tire 1, the tread pattern may have left-right line symmetry with respect to the tire equatorial plane CL, left-right asymmetry, or directionality in a tire rotation direction (not illustrated).

Furthermore, in the configuration of FIG. 2, left and right regions demarcated by the tire equatorial plane CL each have the two circumferential main grooves 21, 22. These circumferential main grooves 21, 22 are disposed being left-right symmetric with respect to the tire equatorial plane CL. Five rows of the land portions 31 to 33 are defined by these circumferential main grooves 21, 22. In addition, one land portion 33 is disposed on the tire equatorial plane CL.

However, no such limitation is intended, and five or more circumferential main grooves may be disposed, or the circumferential main grooves may be arranged to be left-right asymmetric with respect to the tire equatorial plane CL (not illustrated). In addition, the land portion may be arranged at a position off from the tire equatorial plane CL, with one circumferential main groove being arranged on the tire equatorial plane CL (not illustrated).

Additionally, of the circumferential main grooves 21, 22 disposed in one region demarcated by the tire equatorial plane CL, the circumferential main groove 21 on the outermost side in the tire width direction is defined as a shoulder main groove, and the circumferential main groove 22 on the tire equatorial plane CL side is defined as a center main groove.

For example, in the configuration of FIG. 2, a distance D1 from the tire equatorial plane CL to a groove center line of the left or right shoulder main groove 21, 21 is in a range of from not less than 45% to not greater than 75% of a tire ground contact half-width TW/2. A distance D2 from the tire equatorial plane CL to the groove center line of the left or right center main groove 22, 22 is in a range of from not less than 10% to not greater than 30% of the tire ground contact half-width TW/2.

The groove center line is defined as an imaginary line connecting midpoints of distances between left and right groove walls.

In a case where the groove center line of the main groove has a zigzag shape or a wave-like shape, a distance to the groove center line is measured with straight lines passing through midpoints of the maximum amplitude positions left and right of the groove center line and parallel to the tire circumferential direction as measurement points.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Moreover, the land portions 31 on the outer side in the tire width direction defined by the outermost circumferential main grooves 21 are defined as shoulder land portions. The shoulder land portion 31 is a land portion located on the outermost in the tire width direction and on the tire ground contact edge T.

Furthermore, land portions 32 on the inner side in the tire width direction defined by the outermost circumferential main grooves 21 are defined as middle land portions. The middle land portion 32 is adjacent to the shoulder land portion 31 with the outermost circumferential main groove 21 disposed therebetween.

Furthermore, the land portion 33 located on the tire equatorial plane CL side than the middle land portion 32 is defined as a center land portion. The center land portion 33 may be disposed on the tire equatorial plane CL (see FIG. 2) or may be arranged at a position off from the tire equatorial plane CL (not illustrated).

Note that, in the configuration including the four circumferential main grooves as in FIG. 2, the pair of shoulder land portions 31, 31, the pair of middle land portions 32,32, and the single center land portion 33 are defined. Additionally, for example, in a configuration including five or more circumferential main grooves, two or more rows of center land portions are defined (not illustrated). In a configuration including three circumferential main grooves, the middle land portion also serves as the center land portion (not illustrated).

Middle Land Portion and Center Land Portion

Figure 3:
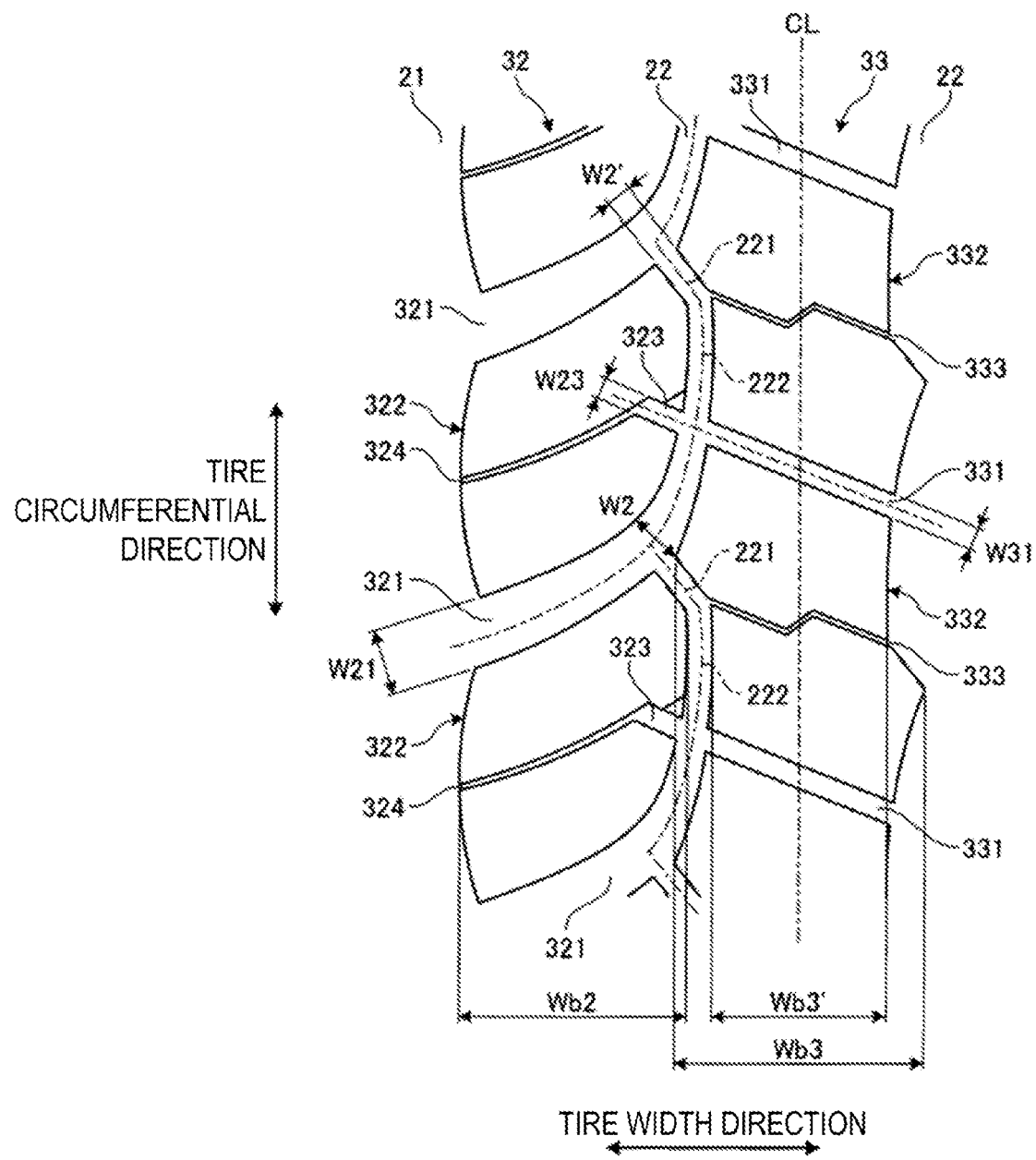
FIG. 3 is an enlarged view illustrating a tread portion center region of the pneumatic tire illustrated in FIG. 2.
Figure 4:
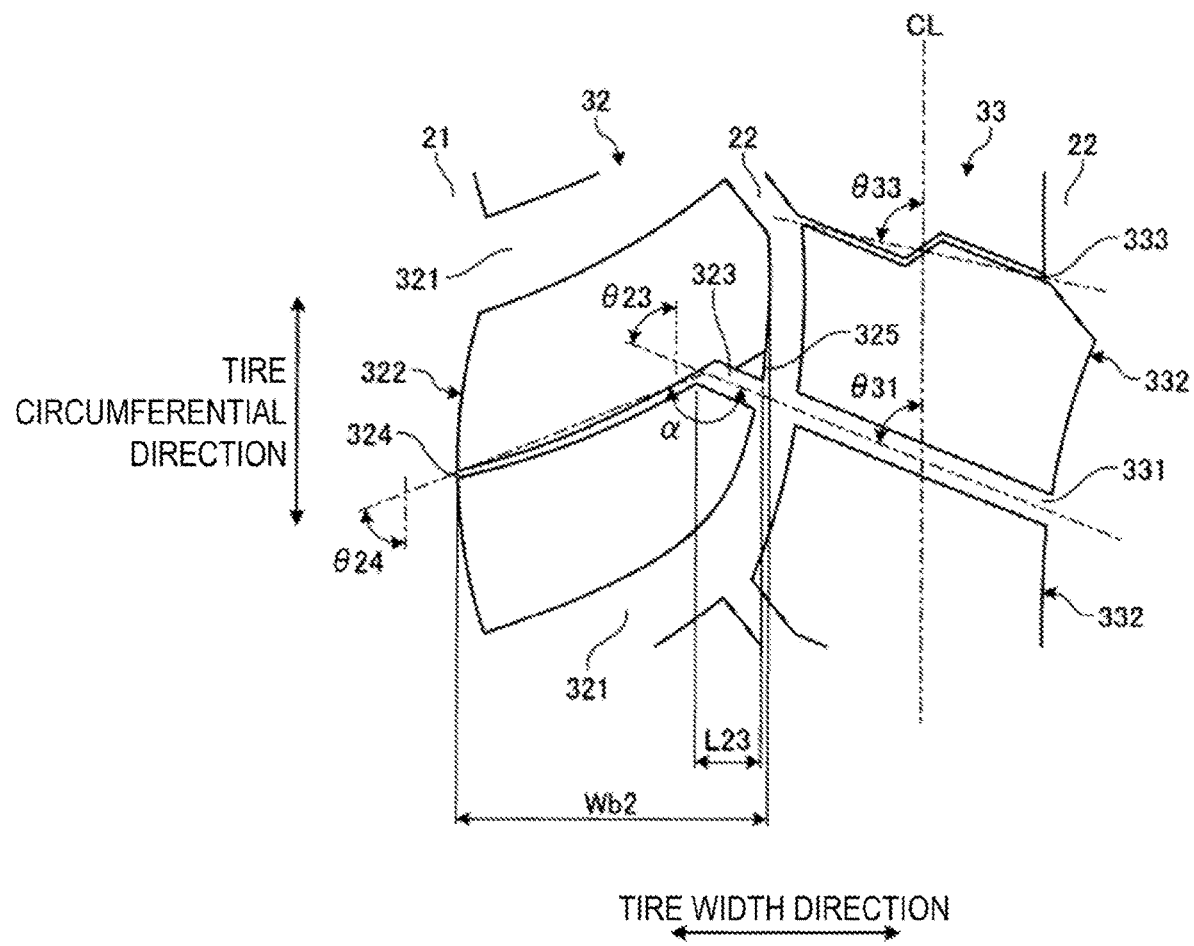
FIG. 4 is an enlarged view illustrating a main portion of the tread portion center region illustrated in FIG. 3.
Figure 5:
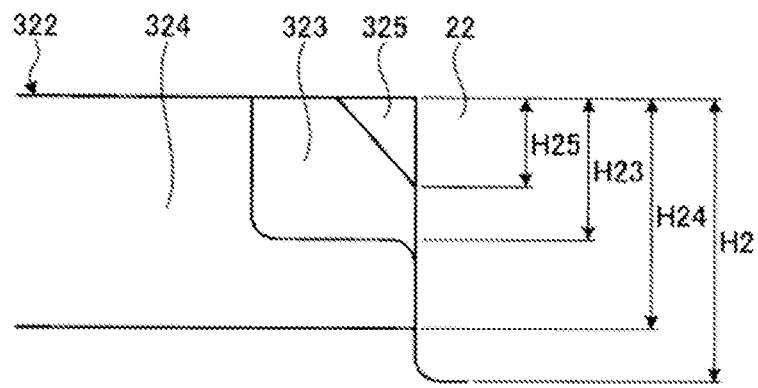
FIG. 5 is a cross-sectional view illustrating a main portion of a middle land portion.

FIG. 3 is an enlarged view illustrating a tread portion center region of the pneumatic tire 1A illustrated in FIG. 2. The identical drawing illustrates block rows of the middle land portion 32 and the center land portion 33. FIG. 4 is an enlarged view illustrating a main portion of the tread portion center region illustrated in FIG. 3. FIG. 5 is a cross-sectional view illustrating a main portion of the middle land portion 32. The identical drawing illustrates a cross-sectional view including a notch portion 323 and a middle sipe 324 in a middle block 322.

As illustrated in FIG. 2, the middle land portion 32 includes a plurality of middle lug grooves 321, a plurality of the middle blocks 322, the notch portions 323, and a plurality of the middle sipes 324. Thus, the middle land portion 32 forms block rows.

The middle lug groove 321 penetrates the middle land portion 32 in the tire width direction and opens to the left and right circumferential main grooves 21, 22 defining the middle land portion 32. Additionally, the plurality of the middle lug grooves 321 are arranged at a predetermined interval in the tire circumferential direction. Moreover, a maximum groove width W21 (see FIG. 3) of the middle lug groove 321 is in the range $5.0 \text{ mm} \leq W21 \leq 15 \text{ mm}$. A maximum groove depth H21 (not illustrated) of the middle lug groove 321 is in the range $4.0 \text{ mm} \leq H21$, and has the relationship $0.30 \leq H21/H1 \leq 1.00$ to a maximum groove depth H1 (not illustrated) of the shoulder main groove 21.

For example, in the configuration of FIG. 3, the center main groove 22 has a bent shape formed by alternately connecting arc-shaped long portions 222 and linear short portions 221 in the tire circumferential direction. Also, a groove width of the center main groove 22 has a minimum value W2' at a connection portion (short portion 221) with the first middle lug groove 321, and has a maximum value W2 at a connection portion (long portion 222) with the second middle lug groove 321. In addition, the linear short portion 221 has a constant groove width. Additionally, the groove width of the arc-shaped long portion 222 increases as it separates from the tire equatorial plane CL.

Additionally, the middle lug groove 321 has an arc shape curved in the tire circumferential direction, and a maximum groove width W21 of the middle lug groove 321 gradually decreases toward the tire equatorial plane CL side. Additionally, the adjacent middle lug grooves 321, 321 are mutually curved in the identical direction. The middle lug groove 321 is smoothly connected to the long portion 222 of the center main groove 22. Accordingly, it appears that the center main groove 22 is formed of alternate connections of the short portions 221 and the long portions 222, which are extensions of the middle lug grooves 321.

The middle block 322 is defined by the adjacent middle lug grooves 321, 321. Additionally, the plurality of middle blocks 322 are arranged in a row in the tire circumferential direction. A ground contact width Wb2 of the middle block 322 preferably has the relationship $0.25 \leq Wb2/(TW/2) \leq 0.50$ to the tire ground contact half-width TW/2 and more preferably has the relationship $0.30 \leq Wb2/(TW/2) \leq 0.50$.

The ground contact width of the block is measured as the maximum linear distance in the tire axial direction on a contact surface between the block and a flat plate when the tire is mounted on a specified rim, inflated to the specified internal pressure, placed perpendicular to the flat plate in a static state, and loaded with a load corresponding to the specified load.

As illustrated in FIG. 3, an edge portion on the inner side in the tire width direction and an edge portion on the outer side in the tire width direction of the middle block 322 have shapes projecting to the center main groove 22 and the shoulder main groove 21 sides. Additionally, the edge portion on the inner side in the tire width direction of the middle block 322 has a shape along the long portion 222 and the short portion 221 of the center main groove 22, in other words, a bent shape in which the long portion having an arc shape and the short portion having a linear shape are connected. Additionally, the edge portion on the outer side in the tire width direction of the middle block 322 has an arc shape formed from a single arc.

As illustrated in FIG. 3, the notch portion 323 is formed at the central portion of the edge portion on the tire equatorial plane CL side of the middle block 322. The single notch portion 323 is formed in each middle block 322. Furthermore, the notch portion 323 is formed on an extension line of a center lug groove 331 described later and opens to a groove opening portion of the center lug groove 331. Thus, the drainage properties of the tread portion center region are improved, and the wet traction characteristics of the tire are improved. Additionally, an opening width W23 of the notch portion 323 preferably has the relationship $0.20 \leq W23/W31 \leq 1.20$ to a maximum groove width W31 of the center lug groove 331 described later and more preferably has the relationship $0.80 \leq W23/W31 \leq 1.20$.

The notch portion is defined as a stepped recess portion (i.e., a step portion) having a bottom surface parallel to the road contact surface of the land portion. The notch portion includes a notch groove or a short lug groove.

The opening width of the notch portion is measured as the maximum value of the opening width to the circumferential main groove in a plan view of a block road contact surface. Additionally, in a case where the block has a chamfered portion (reference sign 325 in FIG. 4) in the opening of the notch portion, the opening width of the notch portion is measured using intersection points of an extension line of an edge portion of the block and extension lines of wall surfaces of the notch portion as measurement points.

The chamfered portion is defined as a portion that connects an intersection portion between the road contact surface of the land portion and the groove wall surface with a flat surface or a curved surface.

In FIG. 4, an extension length L23 of the notch portion 323 in the tire width direction preferably has the relationship $0.10 \leq L23/Wb2 \leq 0.90$ to the ground contact width Wb2 of the middle block 322 and more preferably has the relationship $0.10 \leq L23/Wb2 \leq 0.50$.

The extension length of the notch portion is measured as the maximum value of the extension length of the notch portion on the block road contact surface.

Additionally, as illustrated in FIG. 4, the notch portion 323 is preferably inclined in the tire circumferential direction in the identical direction as the center lug groove 331. In addition, an inclination angle $\theta 23$ of the notch portion 323 with respect to the tire circumferential direction is preferably in the range 35 degrees $\leq \theta 23 \leq 85$ degrees and more preferably in the range 60 degrees $\leq \theta 23 \leq 75$ degrees. The inclination angle $\theta 23$ of the notch portion 323 preferably has the relationship $\theta 31 \leq \theta 23$ to an inclination angle $\theta 31$ of the center lug groove 331 with respect to the tire circumferential direction.

The inclination angle of the notch portion is measured as an angle formed by a straight line connecting the opening portion and a terminating end portion of the notch portion and the tire circumferential direction.

In FIG. 5, a depth H23 of the notch portion 323 preferably has the relationship $0.15 \leq H23/H2 \leq 0.35$ to a groove depth H2 of the center main groove 22. Additionally, a depth H23 of the notch portion 323 is preferably deeper than a depth H25 of the chamfered portion 325. Alternatively, the chamfered portion 325 may be omitted (not illustrated).

The depth of the notch portion is measured as the maximum depth from the block road contact surface to the step portion of the notch portion.

The depth of the chamfered portion is measured as the maximum depth from the block road contact surface.

As illustrated in FIG. 3, the middle sipe 324 extends from the notch portion 323 in the tire width direction and opens to the edge portion on the outer side in the tire width direction of the middle block 322. With this middle sipe 324, a difference in rigidity between the central portion of the middle block 322 and a circumferential edge portion (an edge portion on the middle lug groove 321 side) is alleviated, and thus, heel and toe wear of the tire is suppressed. Additionally, the drainage properties of the road contact surface of the middle blocks 322 are improved, and the wet traction characteristics of the tire are improved. In the configuration in FIG. 3, the middle sipe 324 has a gentle arc shape with an inclination angle with respect to the tire circumferential direction increased to the shoulder main groove 21 side and extends substantially parallel to the middle lug groove 321. Additionally, the middle sipe 324 may extend along the notch portion 323 and penetrate the step portion of the notch portion 323 (see FIG. 5), or may terminate at the connection portion with the notch portion 323 (not illustrated).

As illustrated in FIG. 3, the middle sipe 324 opens to the central portion of the edge portion on the shoulder main groove 21 side of the middle block 322. Specifically, a distance (dimension symbol omitted in the drawings) in the tire circumferential direction from a measurement point of a circumferential length Le2 (see FIG. 9) of the edge portion on the shoulder main groove 21 side of the middle block 322 to the opening portion of the middle sipe 324 is preferably in a range of from not less than 30% to not greater than 70% to the circumferential length Le2 and more preferably in a range of from not less than 35% to not greater than 65%.

In the configuration of FIG. 3, the middle block 322 includes the single middle sipe 324 and does not include other sipes or narrow grooves. Thus, the rigidity of the middle block 322 is increased.

Furthermore, a ground contact area ratio of the portion of the middle block 322 defined by the notch portion 323 and the middle sipe 324 is preferably in a range of from not less than 90% to not greater than 110% and more preferably in a range of from not less than 95% to not greater than 105%. As a result, the ground contact areas of respective portions of the middle blocks 322 are made uniform, and uneven wear of the middle blocks 322 is suppressed.

"Sipe" refers to a cut formed in the tread contact surface and has a sipe width of less than 1.5 mm and a sipe depth of 2.0 mm or greater, so that the sipe closes when the tire comes into contact with the ground.

The sipe width is measured as the maximum distance of the opening width of the sipe at the ground contact surface of the land portion, when the tire is mounted on a specified rim, inflated to the specified internal pressure, and in an unloaded state.

The sipe depth is measured as the maximum distance from the tread contact surface to the sipe bottom, when the tire is mounted on a specified rim, inflated to the specified internal pressure, and in an unloaded state. Additionally, in a configuration in which a sipe includes a ridged/grooved portion on the groove bottom, the sipe depth is measured excluding this portion.

Additionally, as illustrated in FIG. 4, the middle sipe 324 is inclined in the tire circumferential direction in a direction opposite to the notch portion 323. As a result, a connection portion between the middle sipe 324 and the notch portion 323 has a bent shape projecting in the tire circumferential direction. An inclination angle $\theta 24$ of the middle sipe 324 with respect to the tire circumferential direction is preferably in the range 10 degrees $\leq \theta 24 \leq 80$ degrees and more preferably in the range 55 degrees $\leq \theta 24 \leq 75$ degrees. In addition, an angle $\alpha$ formed of the notch portion 323 and the middle sipe 324, in other words, a bend angle of the connection portion between the middle sipe 324 and the notch portion 323 is preferably in the range 75 degrees≤α≤175 degrees and more preferably in the range 100 degrees≤α≤145 degrees.

The inclination angle of the sipe is measured as an angle formed by a straight line passing through both end portions of the sipe on the block road contact surface and the tire circumferential direction.

In addition, a depth H24 of the middle sipe 324 preferably has the relationship H24/H21≤0.95 to the groove depth H21 (not illustrated) of the middle lug groove 321 and more preferably has the relationship H24/H21≤0.90. Thus, the middle sipe 324 is shallower than the middle lug groove 321. Additionally, the depth H24 (see FIG. 5) of the middle sipe 324 preferably has the relationship 0.30≤H24/H1≤0.60 to the groove depth H1 (not illustrated) of the shoulder main groove 21.

Note that, in the configuration of FIG. 2, as described above, the middle block 322 includes the middle sipe 324. In this case, the edge portion of the middle sipe 324 may be chamfered. Furthermore, a narrow groove (not illustrated) may be disposed in place of the middle sipe 324. In such a case, it is necessary that a groove width of the narrow grooves is in a range of from not less than 0.9 mm to not greater than 3.0 mm, and a groove depth is in a range of from not less than 5.0 mm to not greater than 10 mm.

In addition, in the configuration of FIG. 2, the middle sipe 324 has the arc shape, but the configuration is not limited thereto, and the middle sipe 324 may have, for example, a straight shape, an S-shape, or a bent shape (not illustrated). Additionally, a chamfered portion may be formed on the edge portion of the middle sipe 324 (not illustrated).

As illustrated in FIG. 2, the center land portion 33 includes a plurality of the center lug grooves 331, a plurality of center blocks 332, and a plurality of the center sipes 333.

The center lug groove 331 penetrates the center land portion 33 in the tire width direction and opens to the left and right center main grooves 22, 22 defining the center land portion 33. Additionally, the plurality of center lug grooves 331 are arranged at a predetermined interval in the tire circumferential direction.

In FIG. 3, the maximum groove width W31 of the center lug groove 331 is in the range 2.5 mm≤W31≤7.0 mm. Additionally, the maximum groove width W21 of the middle lug groove 321 preferably has the relationship 1.10≤W21/W31≤3.50 to the maximum groove width W31 of the center lug groove 331 and more preferably has the relationship 1.50≤W21/W31≤2.50.

Additionally, as illustrated in FIG. 4, the center lug groove 331 is inclined in the tire circumferential direction in a direction opposite to the middle lug groove 321 in the middle land portion 32. The inclination angle θ31 of the center lug groove 331 with respect to the tire circumferential direction is preferably in the range 35 degrees≤θ31≤85 degrees and more preferably in the range 65 degrees≤θ31≤80 degrees.

Additionally, a groove depth H31 (not illustrated) of the center lug groove 331 is in the range 5.0 mm≤H31≤16 mm. The groove depth H31 of the center lug groove 331 has the relationship 0.80≤H31/H21≤1.20 to the groove depth H21 (not illustrated) of the middle lug groove 321. Additionally, in the configuration of FIG. 3, the center lug groove 331 has a linear shape.

The center block 332 is defined by the adjacent center lug grooves 331, 331. Additionally, the plurality of center blocks 332 are arranged in a row in the tire circumferential direction.

In FIG. 3, a ground contact width Wb3 of the center block 332 preferably has the relationship 0.80≤Wb3/Wb2≤1.40 to the ground contact width Wb2 of the middle block 322 and more preferably has the relationship 0.90≤Wb3/Wb2≤1.20.

As illustrated in FIG. 3, edge portions of the center block 332 in the tire width direction have a shape in which two arc portions recessed to the left and right center main grooves 22, 22 are connected. Specifically, the edge portions of the center block 332 have a shape along the pair of long portions 222, 222 and one short portion 221 in the center main groove 22, in other words, a bent shape that connects the pair of arc portions and one linear portion. Additionally, the center blocks 332 are on the tire equatorial plane CL and have a point-symmetrical shape. Additionally, the maximum ground contact width Wb3 and a minimum ground contact width Wb3' of the center block 332 preferably have the relationship 0.50≤Wb3'/Wb3≤0.90 and more preferably have the relationship 0.60≤Wb3'/Wb3≤0.80.

Additionally, in the configuration of FIG. 3, the edge portion of the above-described middle block 322 overlaps with the edge portion of the center block 332 in the tire width direction, and thus the center main groove 22 has a see-through-less structure. In other words, the measurement point of the land portion width Wb2 of the middle land portion 32 on the center main groove 22 side is on the tire equatorial plane CL side than the measurement point of the land portion width Wb3 of the center land portion 33. As a result, the ground contact area ratio of the tread portion center region is enhanced.

As illustrated in FIG. 3, a center sipe 333 penetrates the center block 332 in the tire width direction and opens to the left and right center main grooves 22, 22. The center sipe 333 has a stepped shape with two bent portions, and extends substantially parallel to the center lug groove 331 at left and right long portions (reference sign omitted in the drawings) connected to the center main grooves 22, 22.

Additionally, in FIG. 4, an inclination angle θ33 of the center sipe 333 with respect to the tire circumferential direction is preferably in the range 50 degrees≤θ33≤130 degrees. Additionally, a depth H33 (not illustrated) of the center sipe 333 preferably has the relationship 0.80≤H33/H24≤1.20 to a depth H24 (see FIG. 5) of the middle sipe 324 in the middle land portion 32. Additionally, the depth H33 of the center sipe 333 preferably has the relationship 1.05≤H33/H31 to a groove depth H31 (not illustrated) of the center lug groove 331 and more preferably has the relationship 1.10≤H33/H31. Accordingly, the center sipe 333 is deeper than the center lug groove 331. Accordingly, the depth relationship between the sipe 333 and the lug groove 331 in the center land portion 33 has a tendency opposite to the depth relationship between the sipe 324 and the lug groove 321 in the middle land portion 32. Note that the upper limit of the depth H33 of the center sipe 333 is not particularly limited, but is subject to restrictions by the range of the ratio H33/H24 described above.

Modified Examples

Figure 6:
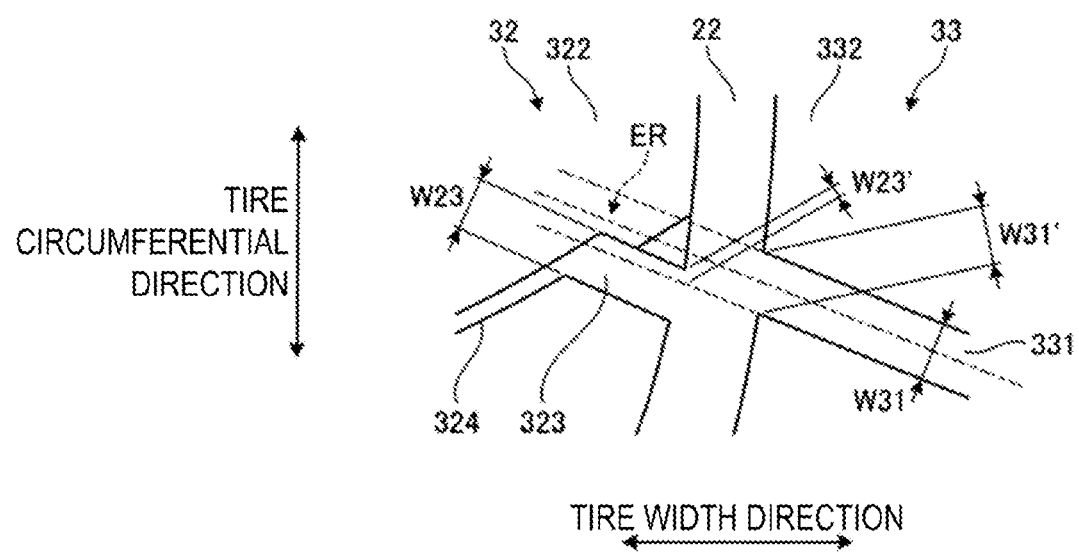
FIG. 6 is an explanatory diagram illustrating a modified example of the pneumatic tire illustrated in FIG. 2.

FIG. 6 is an explanatory diagram illustrating a modified example of the pneumatic tire 1A illustrated in FIG. 2. The identical drawing illustrates a relationship between the notch portion 323 in the middle block 322 and the center lug groove 331 in the center 1 and portion 33.

In the configuration of FIG. 2, as illustrated in FIG. 3, the notch portion 323 in the middle block 322 is formed on an extension line of the center lug groove 331 and opens to a groove opening portion of the center lug groove 331. The notch portion 323 is on an extension line of the groove center line of the center lug groove 331. Also, the width W23 of the notch portion 323 is configured to be substantially identical to an opening width W31' (dimension symbol omitted in the drawings, W31=W31' in FIG. 3) on the center main groove 22 side of the center lug groove 331.

However, no such limitation is intended, and the notch portion 323 may be disposed offset with respect to the groove center line of the center lug groove 331. In this case, as illustrated in FIG. 6, the opening portion of the notch portion 323 and the opening portion of the center lug groove 331 are preferably disposed at identical positions in the tire circumferential direction so as to face one another with the center main groove 22 interposed therebetween. Additionally, at least a portion of the notch portion 323 is preferably in an extension region ER defined by extension lines (dashed lines in the drawing) of left and right groove walls of the center lug groove 331. An opening width W23' of the notch portion 323 in the extension region ER (in other words, an overlapping width between the width W23 of the notch portion 323 and the opening width W31 of the center lug groove 331) preferably have the relationship $0.20 \leq W23'/W31' \leq 1.00$ to the opening width W31' on the center main groove 22 side of the center lug groove 331 and more preferably have the relationship $0.80 \leq W23'/W31' \leq 1.00$.

Figure 7:
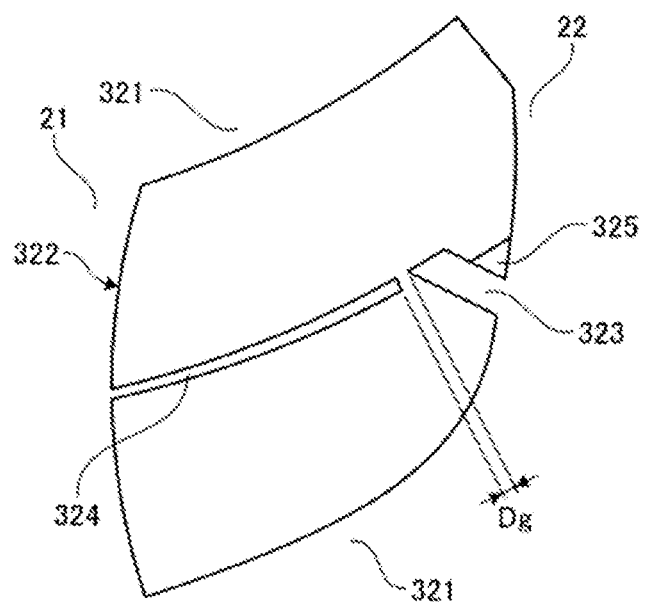
FIG. 7 is an explanatory diagram illustrating a modified example of the pneumatic tire illustrated in FIG. 2.

FIG. 7 is an explanatory diagram illustrating a modified example of the pneumatic tire 1A illustrated in FIG. 2. The identical drawing illustrates the relationship between the notch portion 323 and the middle sipe 324 in the middle block 322.

In the configuration of FIG. 2, as illustrated in FIGS. 3 and 4, the middle sipe 324 is connected to and opens to the notch portion 323, and extends from the opening position to open to the edge portion on the shoulder main groove 21 side of the middle block 322. Such a configuration is preferable in that a drainage function of the middle sipe 324 is improved.

However, no such limitation is intended, and as illustrated in FIG. 7, the middle sipe 324 does not connect to the notch portion 323 but terminates in the vicinity of the notch portion 323, and may extend from this terminating position to open to the edge portion on the shoulder main groove 21 side of the middle block 322. At this time, as long as a distance Dg between the middle sipe 324 and the notch portion 323 is in the range $Dg \leq 1.0$ (mm), the middle sipe 324 is regarded as extending from the notch portion 323. In such a configuration, during tire vulcanization molding, a tiny gap can be formed between a molding blade of the middle sipe 324 and a molding blade of the notch portion 323 in a tire mold (not illustrated), and this is preferable in that vulcanization defects due to dead air space can be reduced. The lower limit of the distance Dg is not particularly limited, but as long as the distance Dg is not less than 0.3 mm, an air flow path is ensured, and an effect of reducing the above-described vulcanization defects is ensured.

Shoulder Land Portion and Second Land Portion

Figure 8:
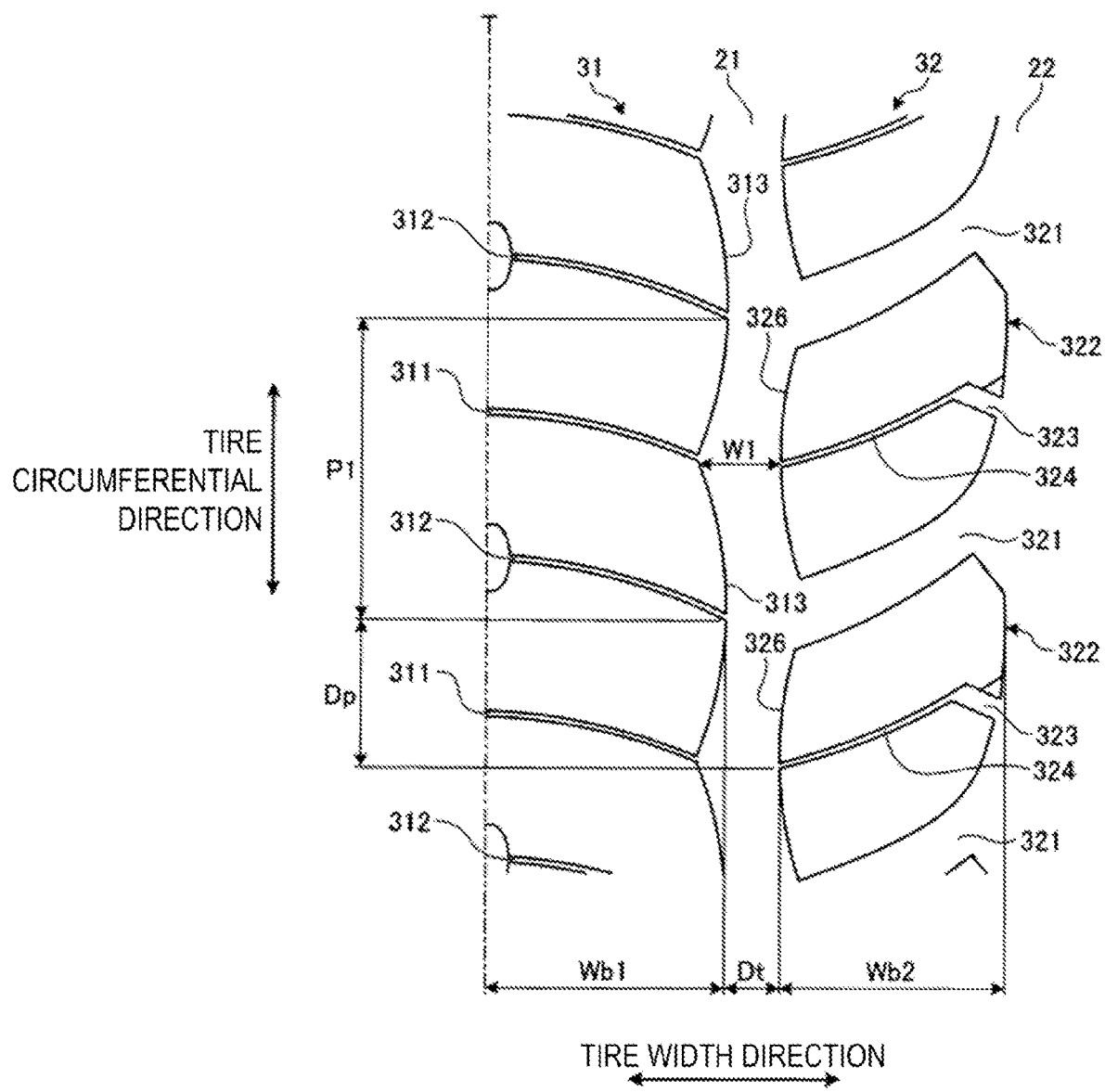
FIG. 8 is an enlarged view illustrating a tread portion shoulder region of the pneumatic tire illustrated in FIG. 2.
Figure 9:
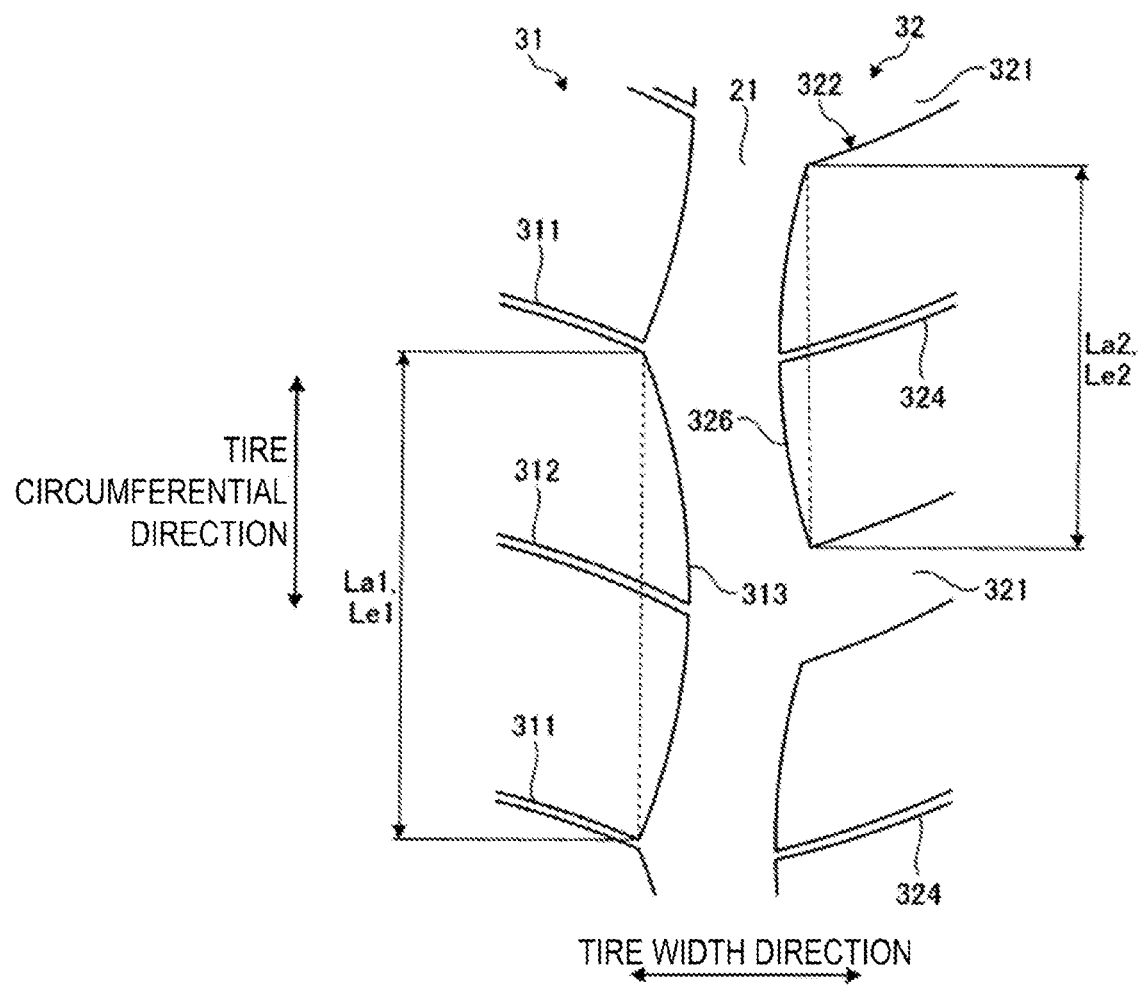
FIG. 9 is an enlarged view illustrating a main portion of the tread portion shoulder region illustrated in FIG. 8.

FIG. 8 is an enlarged view illustrating a tread portion shoulder region of the pneumatic tire 1A illustrated in FIG. 2. The identical drawing illustrates block rows of the shoulder land portion 31 and the middle land portion 32. FIG. 9 is an enlarged view illustrating a main portion of the tread portion shoulder region illustrated in FIG. 8.

As illustrated in FIG. 2, the shoulder land portion 31 includes only a plurality of first and second shoulder sipes 311, 312, and does not include a through lug groove. Thus, the shoulder land portion 31 forms a rib continuous in the tire circumferential direction.

The shoulder sipes 311, 312 penetrate the shoulder land portion 31 in the tire width direction and open to the respective shoulder main groove 21 and tire ground contact edge T. Additionally, the first and second shoulder sipes 311, 312 are disposed alternately in the tire circumferential direction. Because these shoulder sipes 311, 312 close when the tire comes into contact with the ground, the shoulder land portion 31 is not divided in the tire circumferential direction. Additionally, the shoulder sipes 311, 312 are inclined in the tire circumferential direction in a direction mutually opposite to the middle sipe 324 in the middle land portion 32.

As illustrated in FIG. 8, the first shoulder sipe 311 opens to a connection portion of an arc portion 313 (see FIG. 8) described later, and the second shoulder sipe 312 opens to the maximum protruding position of the arc portion 313. Additionally, the first and second shoulder sipes 311, 312 have a gentle arc shape with an inclination angle with respect to the tire circumferential direction increased to the tire ground contact edge T side. The first and second shoulder sipes 311, 312 are inclined in mutually identical directions with respect to the tire circumferential direction. Additionally, the first and second shoulder sipes 311, 312 are inclined in the tire circumferential direction in a direction opposite to the middle sipe 324 in the middle block 322.

As illustrated in FIG. 8, the edge portion on the inner side in the tire width direction of the shoulder land portion 31 has a continuous arc shape formed by connecting a plurality of the arc portions 313. In other words, the edge portion of the shoulder land portion 31 includes the plurality of arc portions 313 projecting to the shoulder main groove 21 side, and these arc portions 313 are provided continuously in the tire circumferential direction to form the continuous arc shape. As a result, the uneven wear of the edge portion in the shoulder land portions 31 is suppressed.

As described above, the middle land portion 32 includes the plurality of middle blocks 322 defined by the plurality of middle lug grooves 321, and the edge portions on the outer side in the tire width direction of the middle blocks 322 have arc shapes formed by a single arc portion 326. As a result, the continuous arc shapes of the edge portion of the shoulder land portion 31 and the arc shapes of the edge portion of the middle land portion 32 face one another with the shoulder main groove 21 interposed therebetween.

One arc portion is defined as a portion formed by extracting a contour line of the edge portion on the main groove side of the land portion and defined by adjacent inflection points on the contour line in a tread plane view.

Additionally, radii of curvature of the arc portions 313, 326 are preferably in a range of from not less than 40 mm to not greater than 150 mm.

Additionally, as illustrated in FIG. 8, the maximum protruding positions (reference sign omitted in the drawings) of the arc portions 313 of the shoulder land portion 31 and the maximum protruding positions of the arc portions 326 of the middle block 322 are arranged in a staggered manner in the tire circumferential direction. As a result, the arc portion 313 of the shoulder land portion 31 faces the opening portion of the middle lug groove 321 in the middle land portion 32, and the arc portion 326 of the middle block 322 faces the connection portion of the adjacent arc portions 313 of the shoulder land portion 31 (in FIG. 8, the opening portion of the first shoulder sipe 311).

A distance Dp in the tire circumferential direction between the maximum protruding position of the arc portion 313 of the shoulder land portion 31 and the maximum protruding position of the arc portion 326 of the middle block 322 preferably has the relationship $0.20 \leq Dp/P1 \leq 0.60$ to a pitch length P1 of the arc portion 313 of the shoulder land portion 31 and more preferably has the relationship $0.35 \leq Dp/P1 \leq 0.50$.

Additionally, the ground contact width Wb1 of the shoulder land portion 31 and the ground contact width Wb2 of the middle land portion 32 preferably have the relationship $0.80 \leq Wb2/Wb1 \leq 1.20$ and more preferably have the relationship $0.90 \leq Wb2/Wb1 \leq 1.10$.

As illustrated in FIG. 8, the shoulder main groove 21 has a see-through structure in the tire circumferential direction. In other words, the edge portions of the left and right land portions 31, 32 do not overlap in the tire width direction in a projection view in the tire circumferential direction. Additionally, a see-through width Dt of the shoulder main groove 21 and the maximum groove width W1 preferably have the relationship $0.60 \leq Dt/W1 \leq 0.90$ and more preferably have the relationship $0.70 \leq Dt/W1 \leq 0.80$. As a result, pass-by noise performance and wet performance of the tire are improved.

The see-through width Dt is measured as the distance Dt in the tire width direction at the maximum width positions of the left and right land portions.

Additionally, in FIG. 9, a circumferential length La1 of the arc portion 313 of the shoulder land portion 31 and the pitch length P1 preferably have the relationship $0.80 \leq La1/P1 \leq 1.00$ and more preferably have the relationship $0.90 \leq La1/P1 \leq 1.00$. Accordingly, one arc portion 313 extends across the entire edge portion of the shoulder land portion 31 to form the arc-shaped edge portion. Note that in the configuration of FIG. 9, the circumferential length La1 of the arc portion 313 is substantially equal to the pitch length P1 (see FIG. 8) of the arc portion 313.

The circumferential length of the arc portion is measured as an extension length in the tire circumferential direction of a chord connecting both end portions of the arc.

In addition, a circumferential length La2 of the arc portion 326 of the middle block 322 and the circumferential length Le2 of its edge portion preferably have the relationship $0.80 \leq La2/Le2 \leq 1.00$ and more preferably have the relationship $0.85 \leq La2/Le2 \leq 1.00$. Accordingly, the entire edge portion on the shoulder main groove 21 side of the middle block 322 has an arc shape. Note that in the configuration of FIG. 9, the circumferential length La2 of the arc portion 326 is substantially equal to the circumferential length Le2 of the edge portion.

The circumferential length of the edge portion of the block is measured as a distance in the tire circumferential direction between respective intersection points, which are between the groove wall of the circumferential main groove partitioning the block and the groove walls of the pair of lug grooves. When a corner portion of the block has a chamfered portion, the above-described intersection point of the groove wall is defined by an extension line of the groove wall.

Additionally, as illustrated in FIG. 8, a distance (dimension symbol omitted in the drawings) in the tire circumferential direction from an end portion of the arc portion 313 of the shoulder land portion 31 to the maximum protruding position is preferably in a range of from not less than 40% to not greater than 60% to the circumferential length La1 of the arc portion 313 and more preferably in a range of from not less than 45% to not greater than 55%. Thus, the maximum protruding position is located at the center of the arc portion 313. Similarly, a distance (dimension symbol omitted in the drawings) in the tire circumferential direction from an end portion of the arc portion 326 of the middle block 322 to the maximum protruding position is preferably in a range of from not less than 40% to not greater than 60% to the circumferential length La2 of the arc portion 326 and more preferably in a range of from not less than 45% to not greater than 55%.

For example, the edge portion of the middle land portion 32 is recessed at a position where the edge portion of the shoulder land portion 31 projects, and conversely, the edge portion of the middle land portion 32 projects at a position where the edge portion of the shoulder land portion 31 is recessed. Additionally, the maximum protruding position of the arc portion 313 of the shoulder land portion 31 is substantially the identical position to the maximum protruding position of the arc portion 326 of the middle land portion 32 in the tire circumferential direction, and a ratio Dp/P1 in FIG. 8 is about 50%. As a result, a distance between the edge portion of the shoulder land portion 31 and the edge portion of the middle land portion 32, in other words, the groove width of the shoulder main groove 21 increases or decreases periodically and continuously in the tire circumferential direction. Thus, the drainage properties of the shoulder main groove 21 are improved, and the wet traction characteristics of the tire are improved.

Also, the maximum groove width W1 of the shoulder main groove 21 is greater than the maximum groove width W2 (see FIG. 3) of the center main groove 22. As a result, while the ground contact area of the tread portion center region is ensured, wet performance is enhanced. Additionally, the maximum groove width W1 of the shoulder main groove 21 preferably has the relationship $0.70 \leq W2/W1 \leq 0.95$ to the maximum groove width W2 of the center main groove 22 and more preferably has the relationship $0.70 \leq W2/W1 \leq 0.80$.

Modified Examples

Figure 10:
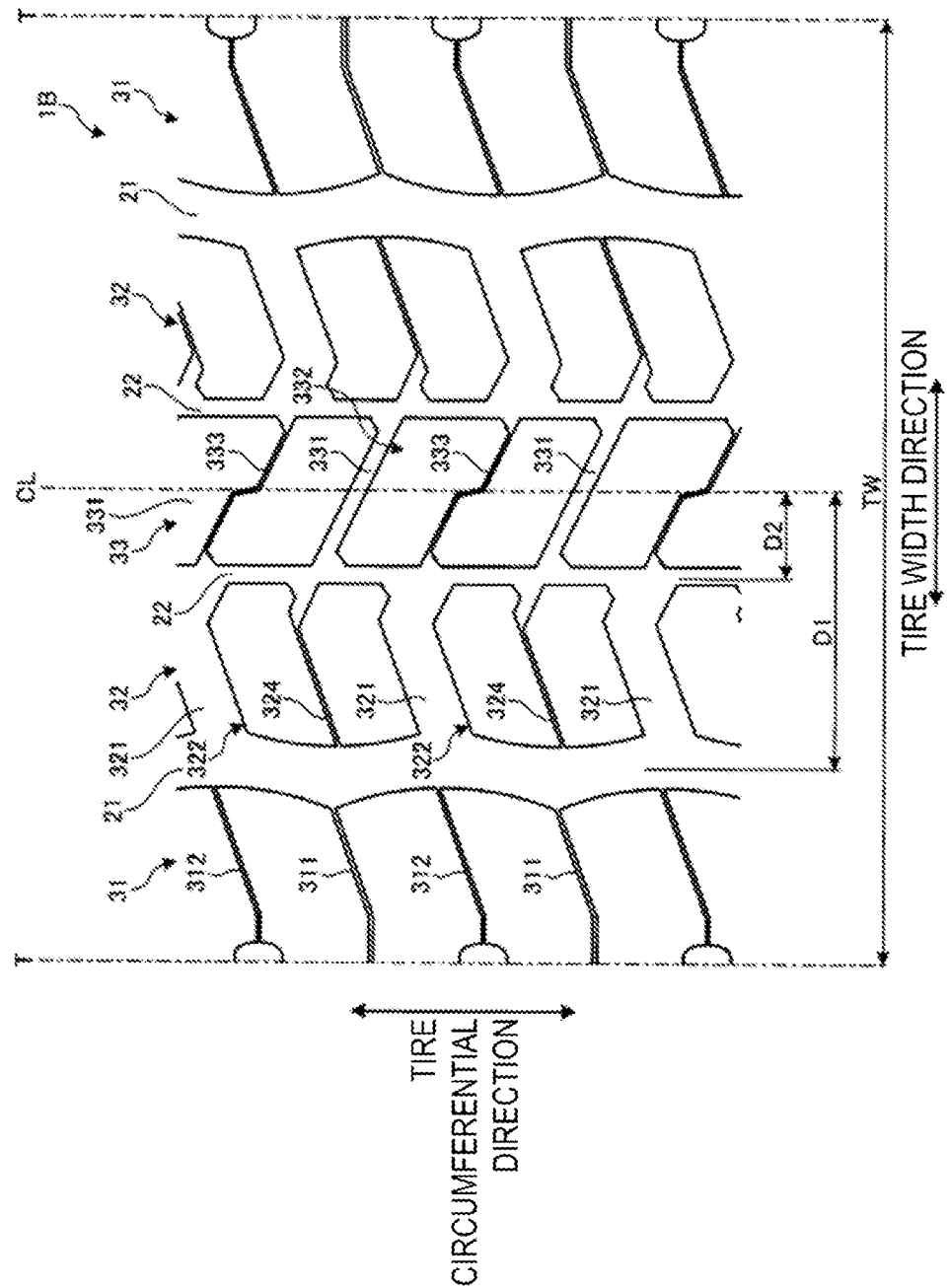
FIG. 10 is an explanatory diagram illustrating a modified example of the pneumatic tire illustrated in FIG. 2.
Figure 11:
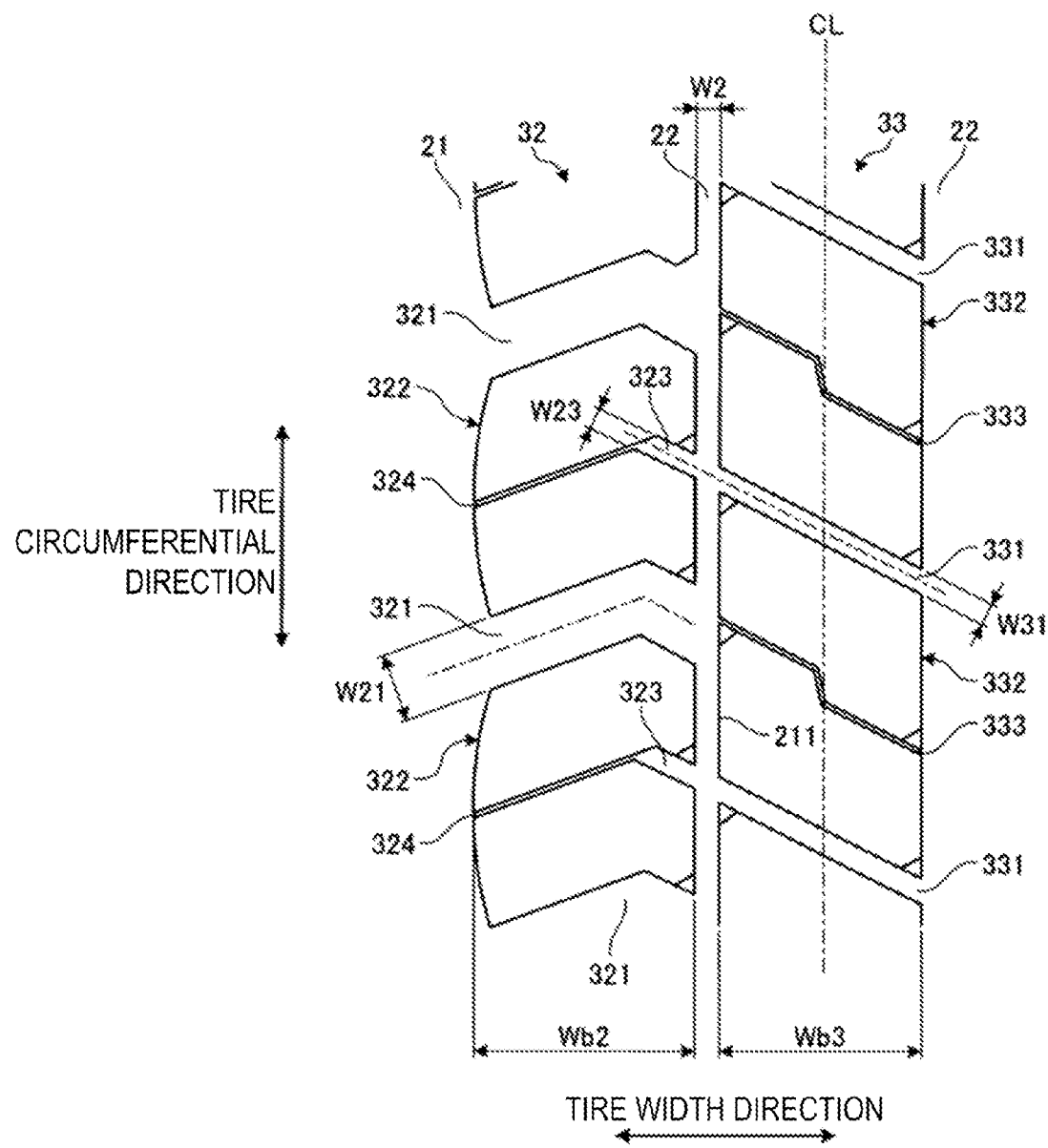
FIG. 11 is an enlarged view illustrating a tread portion center region of the pneumatic tire illustrated in FIG. 10.

FIGS. 10 and 11 are explanatory diagrams illustrating a modified example of the pneumatic tire illustrated in FIG. 2. In these drawings, FIG. 10 illustrates a tread surface of an all-season tire 1B having a tread pattern different from that of FIG. 2, and FIG. 11 illustrates an enlarged view of a tread portion center region of the tire of FIG. 10. In these drawings, constituents that are identical to constituents illustrated in FIG. 2 have identical reference signs, and explanations thereof are omitted.

As illustrated in FIG. 10, in the pneumatic tire 1B of the modified example, the center main groove 22 has a straight shape with the constant groove width W2. Accordingly, the edge portions of the middle land portion 32 and the center land portion 33 on the center main groove 22 sides have a straight shape parallel to the tire circumferential direction. The maximum groove width W2 of the center main groove 22 is narrower than the maximum groove width W1 of the shoulder main groove 21, similarly to the configuration in FIG. 2.

Also, as illustrated in FIG. 11, the middle lug groove 321 has an L-shape with a constant groove width W21. Specifically, the L-shaped middle lug groove 321 is formed by connecting a long linear portion and a short linear portion, and has a bent portion that projects in the tire circumferential direction. In addition, the short straight linear portion in the L-shape is disposed on the center main groove 22 side. An extension length of the short linear portion in the L-shape in the tire width direction is substantially equal to the extension length of the notch portion 323. Also, the long linear portion in the L-shape is inclined in the tire circumferential direction in a direction opposite to the center lug groove 331. The middle sipe 324 has a straight shape.

Effects

As described above, the pneumatic tire 1 (1A, 1B) includes the shoulder main groove 21 and the center main groove 22, the shoulder land portion 31, the middle land portion 32, and the center land portion 33. The shoulder main groove 21 and the center main groove 22 are disposed in one region demarcated by the tire equatorial plane CL. The shoulder land portion 31, the middle land portion 32 and the center land portion 33 are defined by the shoulder main groove 21 and the center main groove 22 (see FIG. 2). The center land portion 33 includes the plurality of center lug grooves 331 and the plurality of center blocks 332. The plurality of center lug grooves 331 penetrate the center land portion 33. The plurality of center blocks 332 are defined by the center lug grooves 331 (see FIG. 3). The middle land portion 32 includes the plurality of middle lug grooves 321, the plurality of middle blocks 322, the notch portion 323, and the middle sipe 324. The plurality of middle lug grooves 321 penetrate the middle land portion 32. The plurality of middle blocks 322 are defined by the middle lug grooves 321. The notch portion 323 is the edge portion on the center main groove 22 side of the middle block 322 and formed on the extension line of the center lug groove 331. The middle sipe 324 extends from the notch portion 323 and opens to the edge portion on the shoulder main groove 21 side of the middle block 322.

In such a configuration, (1) since the middle block 322 is the edge portion on the center main groove 22 side and provided with the notch portion 323 on the extension line of the center lug groove 331, this is advantageous in that the drainage properties of the tread portion center region are improved and the wet traction characteristics of the tire are improved. Additionally, (2) since the middle block 322 includes the middle sipe 324 extending from the notch portion 323 and opening to the edge portion of the shoulder main groove 21 in the middle block 322, this is advantageous in that the difference in rigidity between the central portion of the middle block 322 and the circumferential edge portion (the edge portion on the middle lug groove 321 side) is alleviated and heel and toe wear of the tire is suppressed. Additionally, (3) this is advantageous in that the middle sipe 324 improves the drainage properties of the road contact surface of the middle block 322 and the wet traction characteristics of the tire are improved.

Additionally, in the pneumatic tire 1, the opening width W23 of the notch portion 323 in the middle block 322 has the relationship 0.20≤W23/W31'≤1.20 to the opening width W31' (dimension symbol omitted in the drawings) on the center main groove 22 side of the center lug groove 331 (see FIG. 3). This is advantageous that the opening width W23 of the notch portion 323 is made appropriate. In other words, the lower limit ensures the effect of improving the drainage properties by the notch portion 323 and ensures the wet traction performance of the tire. The upper limit ensures the rigidity of the middle block 322 and ensures the uneven wear resistance performance of the tire.

In the pneumatic tire 1, the extension length L23 of the notch portion 323 in the middle block 322 in the tire width direction has the relationship 0.10≤L23/Wb2≤0.50 to the ground contact width Wb2 of the middle block 322 (see FIG. 4). Such a configuration is advantageous because the extension length L23 of the notch portion 323 is made appropriate. In other words, the lower limit ensures the effect of improving the drainage properties by the notch portion 323 and ensures the wet traction performance of the tire. The upper limit ensures the rigidity of the middle block 322 and ensures the uneven wear resistance performance of the tire.

Additionally, in the pneumatic tire 1, the notch portion 323 in the middle block 322 is inclined in the tire circumferential direction in the direction identical to the extension line of the center lug groove 331 (see FIG. 4). This has the advantage that the drainage action by the notch portion 323 is further improved.

Additionally, in the pneumatic tire 1, the maximum groove width W21 of the middle lug groove 321 has the relationship 1.50≤W21/W31≤2.50 to the maximum groove width W31 of the center lug groove 331 (see FIG. 3). This has the advantage that the groove width ratio W21/W31 is made appropriate. In other words, the lower limit ensures the maximum groove width W21 of the middle lug groove 321 and ensures the drainage properties of the tread portion center region. Additionally, the upper limit ensures the rigidity or the ground contact area of the center land portion 33 and ensures steering stability performance of the tire.

In this pneumatic tire 1, the inclination angle θ31 (see FIG. 4) of the center lug groove 331 with respect to the tire circumferential direction is in the range 35 degrees≤θ31≤85 degrees. This has the advantage that the inclination angle θ31 of the center lug groove 331 is made appropriate. In other words, the lower limit ensures the rigidity of the center block 332 and ensures the uneven wear resistance performance of the tire. Furthermore, the upper limit ensures the effect of improving the wet traction characteristics by the center lug groove 331.

Additionally, in the pneumatic tire 1, the opening width W23' (see FIG. 6) of the notch portion 323 in the middle block 322 in the extension region of the center lug groove 331 has the relationship 0.20≤W23'/W31≤1.00 to the maximum groove width W31 of the center lug groove 331. Such a configuration is advantageous because the opening width W23' of the notch portion 323 is made appropriate. The lower limit ensures the effect of improving the drainage properties by the notch portion 323 and ensures the wet traction performance of the tire. The upper limit ensures the rigidity of the middle block 322 and ensures the uneven wear resistance performance of the tire.

Additionally, with the pneumatic tire 1, the middle block 322 does not include the notch portion in the edge portion on the shoulder main groove 21 side (see FIG. 3).

Additionally, in the pneumatic tire 1, the middle sipe 324 in the middle block 322 is inclined in the tire circumferential direction in the direction opposite to the notch portion 323 (see FIG. 4). As a result, the edge portion having the bent shape is formed at the connection portion between the notch portion 323 and the middle sipe 324, which has the advantage that the traction characteristics of the tire are improved.

Additionally, in the pneumatic tire 1, the angle α formed by the notch portion 323 and the middle sipe 324 is in a range of from 100 degrees≤α≤160 degrees. This is advantageous in that the bent shape of the edge portion at the connection portion between the notch portion 323 and the middle sipe 324 is made appropriate. In other words, the lower limit ensures the rigidity of the middle block 322 and ensures the uneven wear resistance performance of the tire. Furthermore, the upper limit ensures the effect of improving the traction performance by the edge portion having the bent shape.

In addition, with the pneumatic tire 1, the middle block 322 includes the single middle sipe 324. In addition, the ground contact area ratio of the portion of the middle block 322 defined by the notch portion 323 and the middle sipe 324 is in a range of from not less than 90% to not greater than 110%. This has the advantage that the ground contact areas of the respective portions of the middle blocks 322 are made uniform, and the uneven wear of the middle blocks 322 is suppressed.

Additionally, with the pneumatic tire 1, the depth H24 of the middle sipe 324 and the groove depth H21 of the middle lug groove 321 have the relationship H24/H21≤0.95 (see FIG. 5). In such a configuration, the middle sipe 324 is deeper than the middle lug groove 321, which has the advantage that while the rigidity of the middle block 322 is ensured, the effect of improving the drainage properties by the middle sipe 324 can be obtained.

Additionally, with the pneumatic tire 1, the center block 332 includes the center sipe 333 that penetrates the center block 332 (see FIG. 3). Additionally, the depth H33 of the center sipe 333 and the groove depth H31 of the center lug groove 331 have the relationship 1.05≤H33/H31. In such a configuration, the center sipe 333 is deeper than the center lug groove 331, which has the advantage that while the rigidity of the center block 332 is ensured, the effect of improving the drainage properties by the center sipe 333 can be obtained.

Additionally, with the pneumatic tire 1A (see FIG. 2), the center main groove 22 has the see-through-less structure (see FIG. 3). As a result, the ground contact area ratio of the tread portion center region is increased, which has the advantage that the wet traction characteristics of the tire are improved.

Additionally, in the pneumatic tire 1A (see FIG. 2), the center main groove 22 has a zigzag shape formed by alternately connecting the short portions 221 and the long portions 222 having the arc shape (see FIG. 3). Thus, the drainage properties of the center main groove 22 are improved, which has the advantage that the wet traction characteristics of the tire are improved.

Example

FIGS. 12A-12B include a table showing the results of performance tests of pneumatic tires according to the embodiments of the technology.

In the performance tests, a plurality of types of test tires were evaluated for (1) uneven wear resistance performance and (2) wet traction performance. The test tires having a tire size of 225/70R19.5 were mounted on specified rims by JATMA and inflated to a specified internal pressure and loaded at a specified load by JATMA. The test tires are mounted on the front wheels of test vehicles 2-D (pickup trucks).

(1) In the evaluation for uneven wear resistance performance, the test vehicle runs for forty thousand km on a paved road, and then heel and toe wear generated in a block is observed for evaluation. Results of the evaluation are expressed as index values and evaluated with Conventional Example being assigned as the reference (100). In this evaluation, larger values are preferable.

(2) In the evaluation for wet traction performance, the test vehicle runs on an asphalt road watered at a water depth of 1 mm and acceleration in a speed section of from 5 to 10 km/h is measured. Evaluation was carried out by expressing the measurement results as index values with the results of Conventional Example being defined as the reference (100). In the evaluation, larger values are preferable.

The test tires of Examples 1 to 12 have the configurations of FIGS. 1 and 2. Additionally, the tire ground contact width TW is 190 mm, the distances D1, D2 of the shoulder main groove 21 and the center main groove 22 are 55.5 mm and 16.3 mm. The ground contact widths Wb2, Wb3 of the middle land portion 32 and the center land portion 33 are 33.5 mm and 37.0 mm. The groove width W31 (=W31') of the center lug groove 331 is constant at 4.2 mm, and the groove depth H31 is 13.4 mm.

In the test tire of Conventional Example having the configuration of Example 1, the center land portion 33 is a rib that continues in the tire circumferential direction and does not include lug grooves. In addition, the middle block 322 does not include the notch portion 323, and the middle sipe 324 penetrates the middle block 322. The test tire of Comparative Example does not include the middle sipe 324 in the configuration of Example 1.

As shown in the test results, it is seen that the uneven wear resistance performance and the wet traction performance of the tire are improved in the test tires of Examples 1 to 12.

The invention claimed is:

1. A pneumatic tire, comprising:
a shoulder main groove and a center main groove disposed in one region demarcated by a tire equatorial plane; and
a shoulder land portion, a middle land portion, and a center land portion defined by the shoulder main groove and the center main groove,
the center land portion comprising a plurality of center lug grooves and a plurality of center blocks, the plurality of center lug grooves penetrating the center land portion, the plurality of center blocks being defined by the plurality of center lug grooves, the middle land portion comprising a plurality of middle lug grooves, a plurality of middle blocks, a notch portion, and a middle sipe, the plurality of middle lug grooves penetrating the middle land portion, the plurality of middle blocks being defined by the plurality of middle lug grooves, the notch portion being an edge portion on the center main groove side of each of the plurality of middle blocks and formed on an extension line of each of the plurality of center lug grooves, the middle sipe extending from the notch portion and opening to an edge portion on the shoulder main groove side of each of the plurality of middle blocks; wherein
each of the plurality of center main grooves has a zigzag shape formed by alternately connecting short portions and long portions having an arc shape, and
a groove width of the arc-shaped long portion increases as it separates from the tire equatorial plane.

2. The pneumatic tire according to claim 1, wherein an opening width W23 of the notch portion in each of the plurality of middle blocks has a relationship 0.20≤W23/W31'≤1.20 to an opening width W31' on the center main groove side of each of the plurality of center lug grooves.

3. The pneumatic tire according to claim 1, wherein an extension length L23 of the notch portion in each of the plurality of middle blocks in a tire width direction has a relationship 0.10≤L23/Wb2≤0.50 to a ground contact width Wb2 of each of the plurality of middle blocks.

4. The pneumatic tire according to claim 1, wherein the notch portion in each of the plurality of middle blocks is inclined in a tire circumferential direction in a direction identical to the extension line of each of the plurality of center lug grooves.

5. The pneumatic tire according to claim 1, wherein an inclination angle θ31 of each of the plurality of center lug grooves with respect to a tire circumferential direction is in a range 35 degrees≤θ31≤85 degrees.

6. The pneumatic tire according to claim 1, wherein an opening width W23' of the notch portion in each of the plurality of middle blocks in an extension region of each of the plurality of center lug grooves has a relationship 0.20≤W23'/W31≤1.00 to a maximum groove width W31 of each of the plurality of center lug grooves.

7. The pneumatic tire according to claim 1, wherein each of the plurality of middle blocks does not comprise the notch portion in an edge portion on the shoulder main groove side.

8. The pneumatic tire according to claim 1, wherein the middle sipe in each of the plurality of middle blocks is inclined in a tire circumferential direction in a direction opposite to the notch portion.

9. The pneumatic tire according to claim 1, wherein an angle α formed by the notch portion and the middle sipe is in a range of from 100 degrees≤α≤160 degrees.

10. The pneumatic tire according to claim 1, wherein each of the plurality of middle blocks comprises the single middle sipe, and a ground contact area ratio of one portion of each of the plurality of middle blocks defined by the notch portion and the middle sipe to an other portion of each of the plurality of middle blocks defined by the notch portion and the middle sipe is in a range of from not less than 90% to not greater than 110%.

11. The pneumatic tire according to claim 1, wherein a depth H24 of the middle sipe and a groove depth H21 of each of the plurality of middle lug grooves have a relationship H24/H21≤0.95.

12. The pneumatic tire according to claim 1, wherein each of the plurality of center blocks comprises a center sipe that penetrates each of the plurality of center blocks, and a depth H33 of the center sipe and a groove depth H31 of each of the plurality of center lug grooves have a relationship 1.05≤H33/H31.

13. The pneumatic tire according to claim 1, wherein each of the plurality of center main grooves has a see-through-less structure.

14. The pneumatic tire according to claim 1, wherein each of the plurality of center main grooves has a zigzag shape formed by alternately connecting short portions and long portions having an arc shape.

15. The pneumatic tire according to claim 1, wherein a groove width of the middle lug grooves gradually decreases toward the tire equatorial plane side.

16. The pneumatic tire according to claim 1, wherein the middle lug groove have an arc shape curved in the tire circumferential direction, and the middle lug grooves are smoothly connected to the center main grooves.

17. The pneumatic tire according to claim 1, wherein the middle blocks include the middle sipe and does not include other sipes or narrow grooves.

18. The pneumatic tire according to claim 1, wherein an edge portion on an inner side in the tire width direction of the middle block has a shape projecting to the center main groove sides.

19. The pneumatic tire according to claim 1, wherein a groove width of the center main groove has a minimum value at a connection portion with the first middle lug groove, and has a maximum value at a connection portion with the second middle lug groove.

20. The pneumatic tire according to claim 1, wherein the middle lug groove has an arc shape curved in the tire circumferential direction, and the middle lug groove is smoothly connected to the center main groove.

* * * * *